Sept. 15, 1953     C. C. LASH     2,652,550
MARINE SEISMOMETER SPREAD
Filed Feb. 23, 1949     2 Sheets-Sheet 1
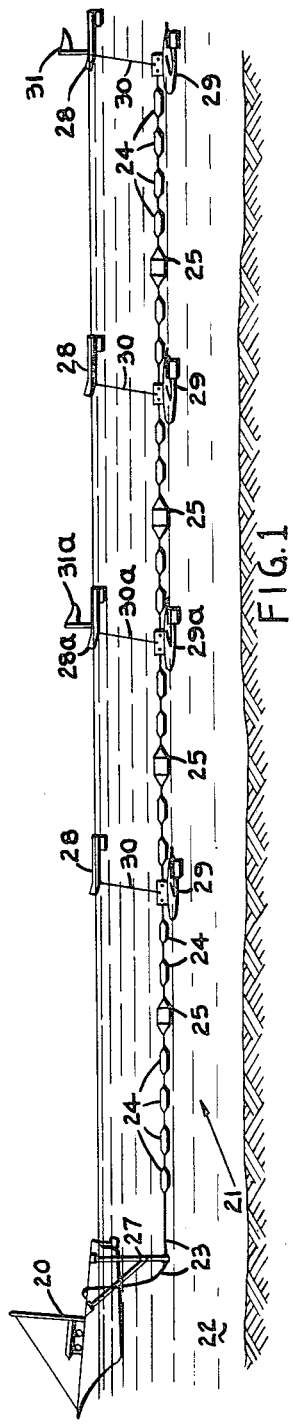
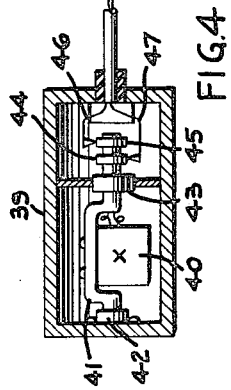
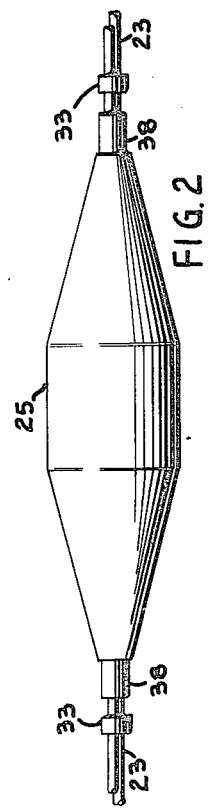
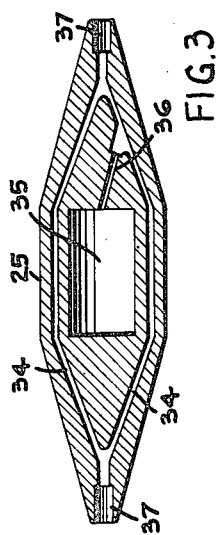
INVENTOR:
CHARLES C. LASH
BY Newell Pottaf
ATTORNEY Sept. 15, 1953　　　　　　C. C. LASH　　　　　　2,652,550
MARINE SEISMOMETER SPREAD
Filed Feb. 23, 1949　　　　　　　　　　　　2 Sheets-Sheet 2
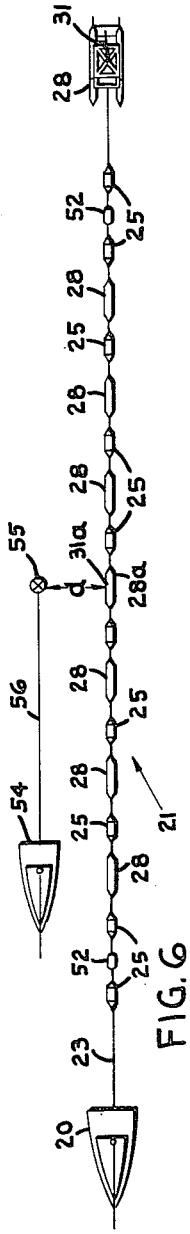
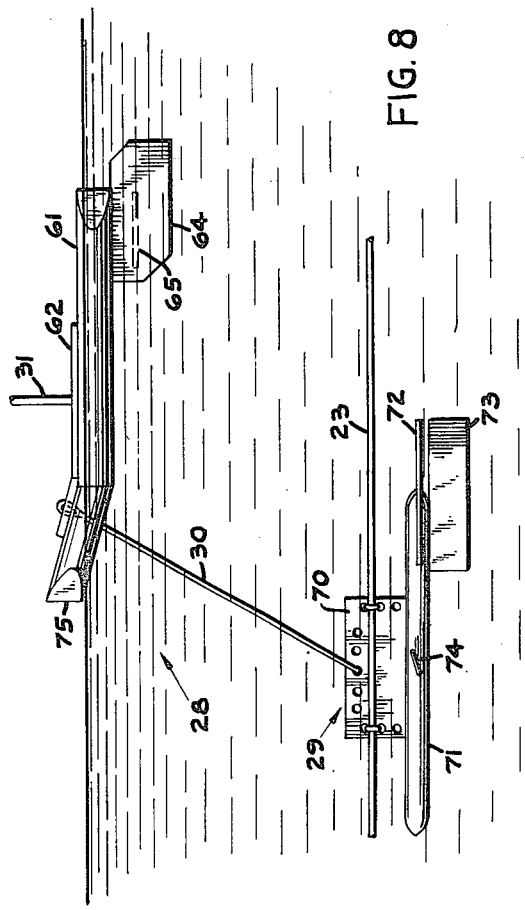
INVENTOR:
CHARLES C. LASH
BY Newell Pottof
ATTORNEY.

Patented Sept. 15, 1953

2,652,550

UNITED STATES PATENT OFFICE 2,652,550

MARINE SEISMOMETER SPREAD

Charles C. Lash, Tulsa, Okla., assignor to Stanolind Oil and Gas Company, Tulsa, Okla., a corporation of Delaware Application February 23, 1949, Serial No. 77,943

3 Claims. (Cl. 340—7)

This invention relates to geophysical surveying and is directed particularly to prospecting by the seismic method over water-covered areas such as in the Gulf of Mexico.

Geophysical surveying using artificially created seismic waves has been extensively and successfully used on land for a number of years, but it is only comparatively recently that the method has been applied to off-shore exploration for oil and gas, particularly in the Gulf of Mexico. In the earliest applications of the seismic method to marine areas, the shots and detectors were individually placed on or under the marine floor in much the same manner as in prospecting on land. The results obtained were generally similar to those for land prospecting.

With the improvement and adaptation of specific techniques and instruments for marine surveying work, the speed of prospecting by this method has increased so markedly over what was previously possible on land that, as a result, more than the normal ratio of geophysical effort in marine prospecting has been concentrated on the seismic method, as compared with magnetic and gravimetric methods, for example.

Both now and in the past one of the difficult problems has been the proper handling of the seismometers used for detecting the seismic waves. Placing the seismometers at known locations in a spread on the marine floor, as in land prospecting, proved even more laborious and time-consuming than on land. Towing a spread of seismometers connected together by a tension and conductor cable along the marine floor or supported from floats behind the recording vessel from one location to another, and shooting either with the seismometers on the marine floor or supported from the floats have resulted in a marked increase in the speed of geophysical surveying coverage. However, dragging the seismometer spread along the sea bottom presents obvious hazards both to the equipment itself and to the marine life and installations located on the marine floor. Employing seismometers at or near the water surface and directly supported by floats results in the picking up of a great deal of noise even under favorable conditions of low wind velocity and relatively smooth water surface. Even in quite calm seas the noise picked up by float-supported, near-surface seismometers is such as to mask most of the desired weaker reflections, while on windy days and when the water surface is rough, the noise may be so strong as to override all reflections and make prospecting impossible. As a matter of fact, there are some seasons of the year when noise conditions from the water surface have been so troublesome that prospecting operations in the Gulf of Mexico were possible only a small fraction of the time. The resultant delays while the crews and equipment are held in readiness for favorable working conditions add very greatly to the expense of the prospecting operation.

It is accordingly a primary object of my invention to provide a detector spread for marine seismograph prospecting which gives a greatly improved signal-to-noise ratio permitting detection of deeper and weaker desired reflection signals. Another object is to provide a means for effectively controlling or holding the seismometers of a marine spread at the optimum depth for signal reception in the water. A further object is to provide a marine seismometer spread capable of operating and obtaining good geophysical data under adverse conditions of weather and water such that usable geophysical data could not hitherto be obtained. Still another object is to provide a marine seismometer spread which may be used independently of the presence of or the conditions on the marine floor either for towing the spread or for the placing of the seismometers. A still further object is to provide a marine seismometer spread employing a type of positive control of seismometer depth from the water surface by means of floats, but without the introduction of adverse noise into the desired signals. Still another and further object is to provide a marine seismometer spread having good discrimination or filtering against the transmission of longitudinal vibrations along the towing cable. Another and still further object is to provide a marine seismometer spread which will permit detection of seismic signals while the spread is in motion during towing, so that the seismometers do not have to come perfectly to rest. Other and further objects, uses, and advantages of my invention will become apparent as this description proceeds.

From observations made under a variety of conditions, it has now been found that the range of depths in water where seismometers may be placed for the most efficient operation is comparatively narrow. Due to the greatly different seismic-wave transmission properties of water and air, reflected or refracted seismic waves traveling upward from the earth below the water to the water surface are almost totally reflected there. As a result, there is a strong probability of interference between succeeding waves (one the incident, and the other a reflected wave) in a seismic wave train at a depth in the water which is one-quarter of the seismic wave-length in that medium. Consequently, to avoid this possible interference which changes the "character" or appearance of the detected waves, it is desirable to locate the seismometers as near as possible to the water surface. It is here that the displacements are a maximum and the possibility of interference is a minimum.

It has also been observed, as was briefly indicated above, that the noise level in the seismic wave band is a maximum at the water surface and further it has been noted that this noise level drops off very sharply with depth. There is, accordingly, for the optimum operation of seismometers, a narrow range of depths below this zone of surface noise and above that depth at which interference effects become pronounced for waves of interest in the seismic band. This range usually extends from about 5 to about 15 feet, with the preferred depth of operation at which quite consistently good records can be obtained being about 10 feet.

It is of course often possible, at the expense of including more or less noise in the recorded signals, to operate at depths less than about 5 feet and somewhat within the zone of surface noise, when for some reason such as shallowness of the water it is necessary or desirable to do so. Also, it is conceivable that useful results such as the emphasis of certain reflections, first arrivals, and the like would be attained by deliberately choosing an operating depth where interference of a selected frequency in the seismic-wave band would occur. This invention offers a ready method of operating at any such desired depth in the water, either outside of or within the 5- to 15-foot range which is presently preferred.

Accordingly, the foregoing enumerated and other objects are accomplished by a towable marine seismometer spread which is designed to operate at a substantially constant depth within the 5 to 15- foot range, being closely-controlled as to depth by means of surface floats but in a particular manner which avoids the introduction of water surface noise into the desired seismic signals. In accordance with my invention, the desired depth control is achieved by first adjusting the spread consisting of the cable, seismometers, and supporting floats to an approximately neutral average value of buoyancy, and then positively maintaining by means of surface floats and suitable weighting elements a plurality of points laterally displaced from and preferably intermediate between the seismometers at the desired depth in the water. In particular by applying towing force to the forward end of the spread at the desired depth and a retarding or dragging force to the trailing end at the same depth, thus creating a substantial tension in the spread cable, together with the maintaining of one or more intermediate points at the desired depth, the variation or change in depth of the seismometers when the spread is slowed down or halted for making a record is held within the desired range. By making the distance or length of path for the transmission of noise signals from the surface depth-controlling floats to the seismometers as long as possible, noise from these sources is held to a minimum due both to the remoteness of the floats and to the damping out of noise by the intervening cable.

This will be better understood by reference to the accompanying drawings forming a part of this application in which like numerals are applied to the same or corresponding parts in the different figures.

In these drawings,

Figure 1 is a cross-section of a body of water through which a spread embodying my invention is being towed by a vessel;

Figures 2 and 3 are respectively elevation and cross-section views of a seismometer-supporting float;

Figure 4 is a cross-section of a seismometer housing and mounting;

Figure 5 is a view of a cable-supporting float;

Figure 6 is a plan view of a complete spread and shooting apparatus operated in accordance with my invention;

Figure 7 is a plan view of a suitable surface float assembly for controlling the seismometer depth; and Figure 8 is a cross-section of a body of water showing the surface float of Figure 7 together with a suitable weight member attached to the seismometer towing cable.

Referring now to these drawings in detail, and to Figure 1 in particular, a vessel 20 is shown towing a spread 21, constructed in accordance with the invention, through a body of water 22. Spread 21 consists of a cable 23 having insulated electrical conductors and strands of high-tensile-strength wire, on which are spaced at intervals a number of cable-supporting floats 24 and a number of seismometer-containing floats 25. The forward end of cable 23 is attached to a spar 27 or the like extending downwardly from vessel 20 into the water from 5 to 15 feet, the point of attachment of cable 23 being preferably at a depth of about 10 feet in the water. To the trailing end of spread 21 and at any desired number of intermediate points are attached floats 28 and weights or sinkers 29 connected by cables 30. End float 28 carries a flag 31 which may be observed from vessel 20 to indicate its position so that the direction of spread 21 may be ascertained at all times—particularly in the presence of cross-currents. The particular end float 28 and sinker 29 serve the dual purpose of maintaining the entire spread in tension and acting as a depth control by virtue of the length of the connecting cable 30.

In accordance with the invention, the spacing and the buoyancy of the cable floats 24 and the buoyancy of the seismometer floats 25 are first arranged or adjusted to bring the resultant buoyancy of each portion of the spread as nearly as practical to a neutral value. Then, despite any remaining unbalance in the buoyancy of the seismometer floats 25, the presence of the intermediate floats 28 between the ends of the spread with their associated sinkers 29 and connecting cables 30 together with the tension in the cable 23 itself, assures that the spread tows at the desired depth and remains close to that depth in the brief time interval when the spread is slowed down or halted for making a record. The drag of floats 28 and cables 30 in passing through the water, which causes them to pull upward on the sinkers or weights 29 and thus raise the spread somewhat during towing, is more or less entirely countered by the considerable weight of the sinkers 29. This weight insures that the departure of connecting cables 30 from the vertical remains comparatively small, so that the variations in depth of spread 21 due to towing speed are small.

Although the spread of Figure 1 is shown employing the float 28 and sinkers 29 between each of the seismometers 25, it will be apparent that any lesser number of these intermediate depth-controlling float and sinker assemblies can be employed; for example, only the float 28a and sinker 29a at the center of the spread, in conjunction with the trailing end float 28 and sinker 29. Because these depth-controlling assemblies are connected midway between the seismometer floats 25 and hence are laterally remote from the seismometers, the noise reaching the seismometers from the surface floats 28 is comparatively small—much smaller, in fact, than if the float 28 is directly above the seismometer float 25.

Another effect contributing to prevent the transmission of vibrations along the cable 23 comes from the distribution of the cable-supporting floats 24 at a plurality of spaced points. This leaves between the floats unsupported portions of the cable which tend to sag. This is an advantage in that these unsupported cable portions give the spread 21 a certain resilience or springiness so that it seeks to become shorter as the towing force or restraining force of drag float 28 is lessened; and as the cable tension decreases, each of these slack loops between cable floats 24 acts as a filter to damp out longitudinal vibrations along the cable from any source and particularly from each depth-controlling float 28 to the seismometer floats 25.

One of these seismometer floats 25 is shown in more detail in Figures 2 and 3. As shown in Figure 2, the float is elongated, symmetrical, and streamlined by providing pointed ends so that it tows easily through the water. The buoyancy of float 25 and the associated portion of cable 23 is preferably adjusted to the desired approximately neutral value by adding or removing small straps of lead 33 from the cable 23 near the ends of the float 25. As is seen in Figure 3, which shows float 25 in cross-section, its interior is provided with one or more slots or passages 34 through which the cable or cables 23 are threaded from end to end, and a central chamber 35 which houses the seismometer assembly. A connecting lead slot 36 extending between the cable slot 34 and chamber 35 provides for a splice and insulated electrical connecting lead from the appropriate conductors in cable 23 to the seismometer. Enlargements 37 at the ends of cable slots 34 at either end of the float 25 provide space for resilient sleeves 38 which help prevent too sharp bending and breakage of cable 23 where it enters and leaves the float.

A suitable seismometer assembly is shown in Figure 4. Inside a watertight cylindrical housing 39, a seismometer 40 is trunnion-mounted in a frame 41 set in a pair of anti-friction bearings 42 and 43. The electrical leads from seismometer 40 are brought out to a pair of slip rings 44, 45 contacted by brushes 46 and 47 which are connected to leads in cable 23 through the waterproof splice and connecting lead in the slot 36. Being free to rotate about the axis provided by bearings 42 and 43, and having its center of gravity at $x$ below this axis, seismometer 40 remains upright at all times despite any rotation of float 25 about cable 23 as an axis. Rotations of the seismometer about axes perpendicular to the cable 23 are generally negligible because of the symmetrical shape of float 25 and the cable tension, created by towing the spread through the water and by the drag of the end assembly, float 28 and sinker 29.

In Figure 5 is shown a typical cable-supporting float 24. This, like the seismometer float 25, is a streamlined symmetrical unit made in two halves clamped together around cable 23 as by means of metal bands 50 or otherwise suitably held together by means of bolts or screws.

The plan view of Figure 6 shows by way of example a complete spread 21 and auxiliary shooting vessel in the relative positions occupied during a typical operation. For simplicity, the cable floats 24 have been omitted from this drawing and only the seismometer floats 25 and the intermediate depth-controlling floats 28 are shown considerably exaggerated in size relative to their actual spacings. In a typical spread there may be, for example, ten seismometers, with the two seismometers at each end spaced from 50 to 100 feet apart and depth-gauge unit 52 located midway between them. The spacing of all of the other seismometers in the spread may be a uniform interval of 200 to 250 feet.

In a typical method of operation, vessel 20 and spread 21 are accompanied along a parallel course by an explosives-carrying vessel 54 which places an explosive charge 55 at a desired shot point and pays out a firing line 56. The location of charge 55 may be offset from the line of spread 21 by a distance $d$ of the order of 300 feet. As the center of spread 21, which is marked by the depth-control float 28a, on which may be mounted if desired an identifying flag 31a, approaches the line from charge 55 perpendicular to the spread direction, i. e., when the center of the spread is almost directly opposite the charge 55, vessel 20 is slowed down and stopped briefly. As soon as the forward motion of the spread is sufficiently slow, and before the seismometer floats 25 have had time to change depth appreciably due to the decrease in tension in cable 23, the explosive 55 is fired, and the seismic wave record is made. The readings of the electric meters indicating remotely the response of the depth gauges 52, and thus the depth of the end seismometers 25 at the time of recording, are noted but are not necessarily automatically recorded. As soon as the record is completed, vessel 20 immediately resumes towing and proceeds on its course to the next recording location.

A typical depth-controlling float and sinker assembly is shown in Figures 7 and 8. As shown in Figure 7, the buoyant float 28 comprises a pair of parallel tubular sheet metal pontoons 60 and 61 interconnected by a cross-braced framework 62 upon which the staff of flag 31 may be mounted. The flexible cable 30 coupling float 28 to the sinker 29 is connected somewhat forward of the center of this framework 62. For streamlining, the forward and rear ends of the tubular pontoons 60 and 61 are preferably pointed or wedge-shaped, the forward ends 75 are bent upwardly at a small angle as seen in Figure 8, and the rear ends are provided with the fixed rudders 63 and 64 between which is a horizontal plane member 65 which both improves the towing properties of the float assembly and serves as additional bracing.

The sinker assembly 29 consists of a sheet metal plate 70 having one or more spaced holes for suitably attaching the depth-controlling cable 30 and the seismometer cable 23, to which sheet is welded a heavy bar of iron or steel 71, preferably rounded at the ends and provided with horizontal and vertical tail planes 72 and 73. Also near the center of the bar 71 is one or more inclined planes 74 which tend to draw the sinker 29 downwardly, thus increasing its apparent weight during towing so as to overcome at least in part the increased drag of float 28 and thus keep the cable 30 more nearly vertical. It will be observed that the upwardly sloping front portions 75 of the pontoons 60 and 61 tend to oppose this downward pull of the plane 74, so that at any normal towing speeds the float assembly 28 will not be pulled under the water surface. A similar or additional effect may also be achieved from the body of the pontoons by weighting the tail or adjusting the angle of tail plane 65 to produce a small downward angle of attack as the assembly moves through the water.

The buoyancy of the float 28 and the weight of sinker 29 may be varied within quite wide limits, the chief limitation being that float 28 must retain sufficient buoyancy at all towing speeds to remain on the surface of the water, and it should have a small enough drag so that its action in raising the sinker 29 and the cable 23 does not exceed reasonable and acceptable limits.

While I have thus described my invention in terms of the foregoing specific illustrations, it is to be understood that these are merely for purposes of illustration and that other and various modifications of the invention will occur to those skilled in the art. For example, a number of different designs of depth-control floats 28 and sinkers 29 are possible, and any number of such units may be distributed along the length of the spread 21, bearing in mind, of course, that the greater the number of floats 28 and the closer they are located to the seismometer floats 25, the more likely it will be that noise is transmitted to the seismometers. The invention, therefore, is not to be considered as limited to the exact described details, but is to be ascertained from the scope of the appended claims.

I claim:

1. A marine seismometer spread adapted for towing by a vessel through a body of water comprising a tension and conductor cable, a plurality of seismometers spaced along said cable and connected to conductors therein, a plurality of supporting floats spaced along and attached to said cable and seismometers, the buoyancy of said floats, cable, and seismometers having an approximately neutral average value in the water, and means attached to said cable for maintaining a plurality of points of said cable laterally remote from said seismometers at a substantially constant depth in the water, said depth-maintaining means at each of said points including a surface float having an inclined surface increasing its apparent buoyancy during forward motion of said spread, a weight having an inclined surface increasing its apparent weight during forward motion of said spread, and a flexible cable connecting said surface float and said weight.

2. A marine seismometer spread adapted for towing by a vessel through a body of water comprising a tension and conductor cable, a plurality of seismometers spaced along said cable and connected to conductors therein, a plurality of buoyant supporting floats spaced along and attached to said cable and seismometers, the buoyancy of said floats, cable, and seismometers being adjusted to an approximately neutral average value in the water, whereby when submerged they all tend to remain at a constant depth, means for applying a towing force to said spread at a depth of between 5 and 15 feet below the water surface, means to apply at said depth a retarding force at the trailing end of said spread to maintain said cable in tension, at least one weight attached to said cable at a point intermediate the ends of said spread and laterally remote from any seismometer, a buoyant float more than capable of supporting said weight and therefore remaining at the water surface, and a flexible lead between 5 and 15 feet in length connecting said weight and said last-mentioned float and forming the sole mechanical linkage between said cable and said float at the water surface.

3. A marine seismometer spread adapted for towing by a vessel through a body of water comprising a tension and conductor cable, a plurality of seismometers spaced along said cable and connected to conductors therein, a plurality of buoyant supporting floats spaced along and attached to said cable and seismometers, the buoyancy of said floats, cable, and seismometers having an approximately neutral average value in the water, whereby when submerged they all tend to remain at a constant depth, and a plurality of depth-maintaining means attached to said cable at a plurality of spaced points between the ends of said spread, each of said points being located approximately midway between and laterally remote from two adjacent seismometers, each of said depth-maintaining means including a surface float, a weight, and a connecting lead between said surface float and said weight of a length substantially equal to the desired depth of submergence for said seismometers, said lead forming the sole mechanical linkage between said spread and said surface float.

CHARLES C. LASH.

References Cited in the file of this patent

UNITED STATES PATENTS

| Number | Name | Date |
|---|---|---|
| 1,470,733 | Hayes | Oct. 16, 1923 |
| 2,203,894 | Cooke | June 11, 1940 |
| 2,241,428 | Silverman | May 13, 1941 |
| 2,401,929 | Hammond | June 11, 1946 |
| 2,423,591 | Flude | July 8, 1947 |
| 2,449,085 | Peterson | Sept. 14, 1948 |
| 2,465,696 | Paslay | Mar. 29, 1949 |
| 2,570,707 | Parr | Oct. 9, 1951 |